Figure 1:
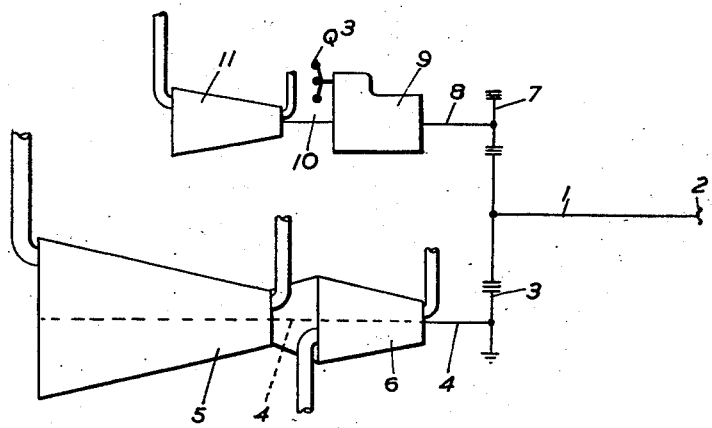

April 27, 1954

R. A. GILBERT 2,676,496

TRANSMISSION APPARATUS, INCLUDING A
UNIDIRECTIONAL TRANSMISSION DEVICE

Filed Aug. 10, 1951

7 Sheets-Sheet 1

Inventor
Ronald A. Gilbert
By
Emery, Holcombe & Blair
Attorneys

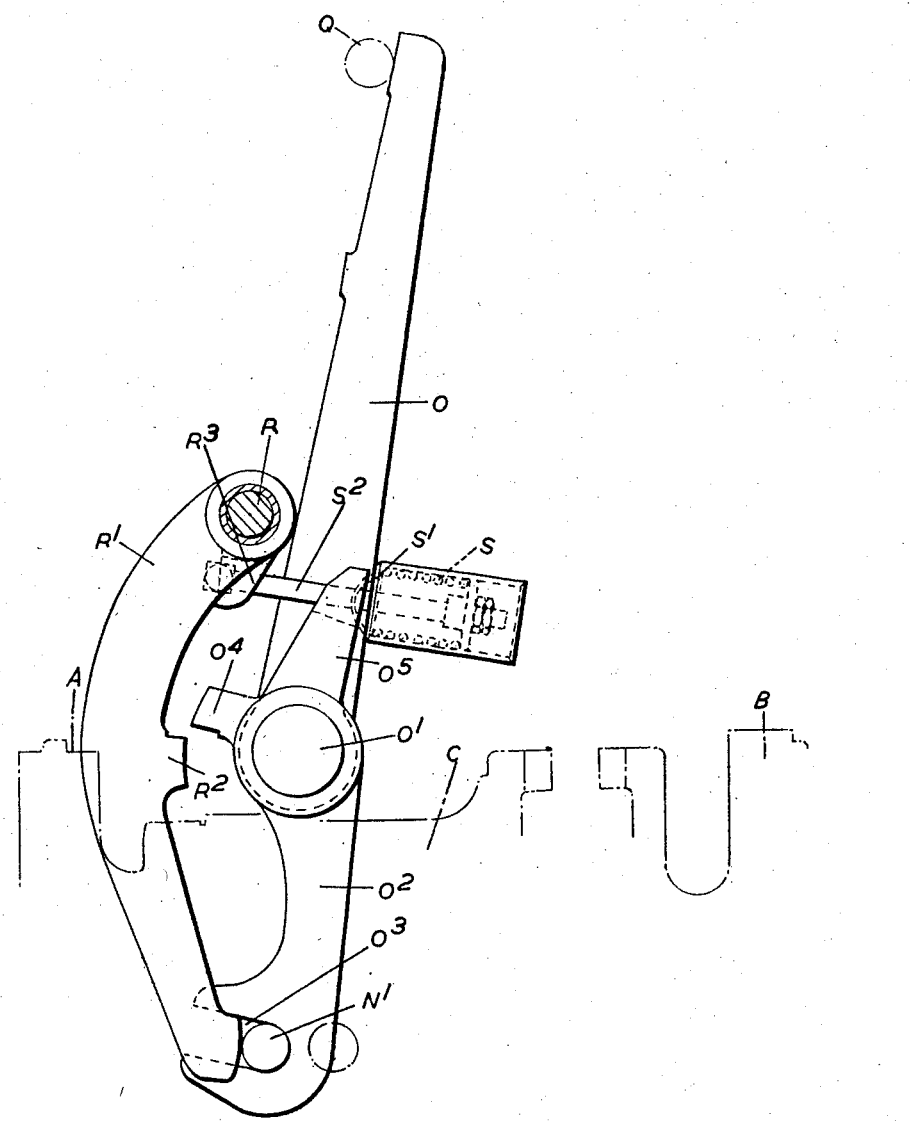

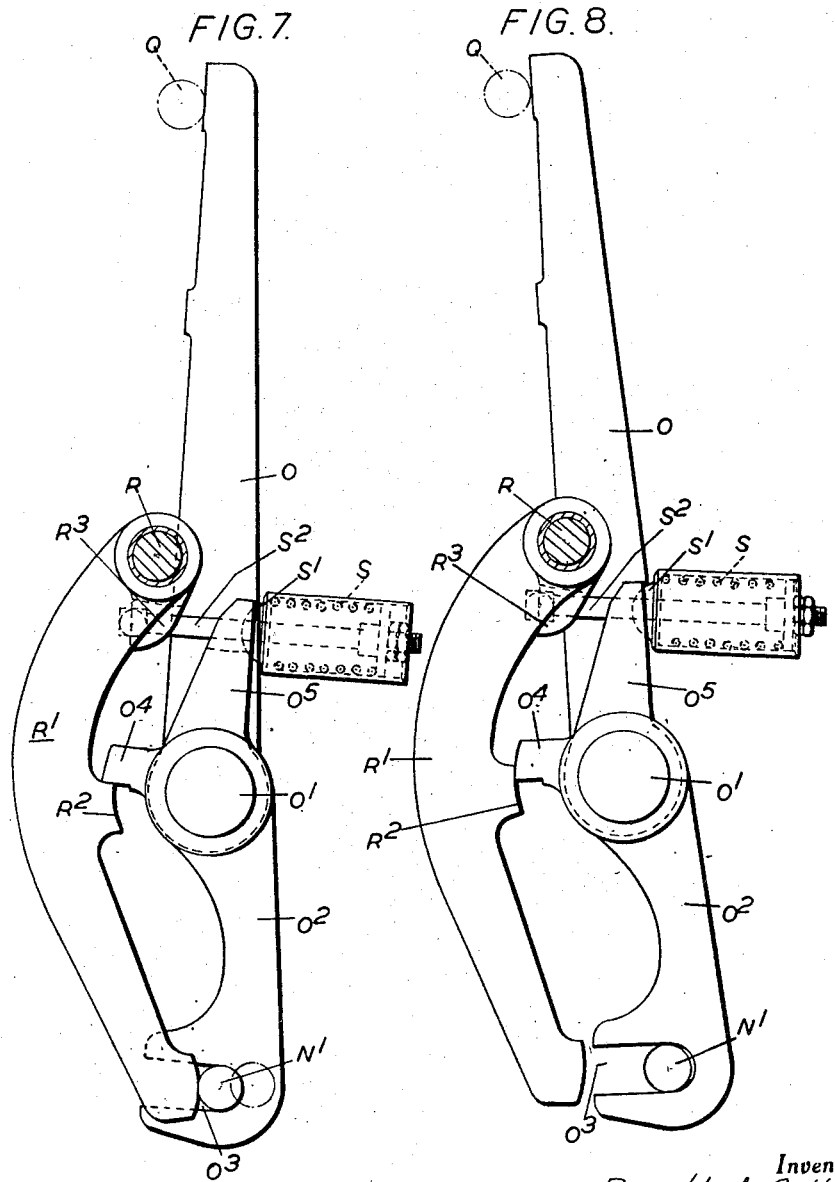

Patented Apr. 27, 1954

2,676,496

UNITED STATES PATENT OFFICE 2,676,496

TRANSMISSION APPARATUS, INCLUDING A
UNIDIRECTIONAL TRANSMISSION DEVICE

Ronald Albert Gilbert, North Wembley, England,
assignor to D. Napier & Son Limited, London,
England, a British company Application August 10, 1951, Serial No. 241,199

6 Claims. (Cl. 74—665)

This invention relates to transmission apparatus including a unidirectional transmission device of the kind comprising driving and driven positive clutch elements connected respectively to driving and driven members and arranged to be engaged and disengaged by axial movement of one clutch element (hereinafter called the movable clutch element) or of a control member for it, relatively to the other clutch element (hereinafter called the fixed clutch element), the movable clutch element or control member being so connected to its associated driving or driven member that limited relative rotation can occur between such clutch element or control member and its driving or driven member, and such limited relative rotation causes the clutch element to be moved relatively to its driving or driven member for engagement or disengagement of the movable and fixed clutch element; while a frictional transmission device is arranged for the transmission of torque to cause relative rotary movement between the fixed clutch element and the movable clutch element or its control member whereby relative rotation between the driving and driven members in one direction or the other acts through the frictional transmission device to cause engagement and disengagement of the clutch elements.

Usually in such unidirectional transmission devices the movement of the movable clutch element will be axial, the clutch being of the dog or ratchet tooth type, and will be caused by rotation of the movable clutch element upon its driving or driven member under the influence of the frictional drag imposed on it by the frictional transmission device. For convenience, therefore, in the present specification it will be assumed that the unidirectional transmission device is in this form although it could be of the kind in which instead of the movable clutch element itself moving axially, an axially movable control member under the influence of the frictional drag of the frictional transmission device causes engagement and disengagement of the clutch elements which in this case might move radially relatively to one another. In the following specification, therefore, the term axially movable clutch element is where appropriate to be interpreted as including an axially movable control member which acts on the movable clutch element to cause engagement and disengagement thereof.

Transmission apparatus including a unidirectional driving device of the kind referred to according to the present invention comprises disengaging mechanism which in its operative position holds the clutch members of the unidirectional driving device positively out of engagement, a catch device which in its operative position prevents the disengaging mechanism from moving from its disengaged position into its engaged position, and means whereby the catch device is controlled in accordance with the movement of the movable element of the clutch in such manner that the catch device is maintained in its operative position at all times when the relative rotation between the two clutch elements is in such direction that if the disengaging mechanism were moved into its engaged position the clutch would automatically engage, but moves into its inoperative position when such relative rotation is in the other direction.

Thus, conveniently, the movable element of the clutch has a degree of movement in the same direction as that which causes its disengagement beyond the position in which it is held by the disengaging mechanism, and the catch device is so operated by this additional movement that when the movable clutch element moves beyond the position in which it is maintained by the disengaging mechanism it serves to move the catch into and maintain it in its inoperative or "released" position, whereas when the movable clutch element bears against the disengaging mechanism, that is to say is attempting to move into its engaged position, against the action of the disengaging mechanism, the catch device occupies its operative position, either positively or under spring action.

The invention may be applied to transmission apparatus for various purposes where it is desired to hold the unidirectional driving device in its disengaged state under certain conditions of operation, but in one particular form of transmission apparatus incorporating the invention which comprises a driven shaft, two or more power units for driving the shaft in a forward direction at different speeds, for example for forward propulsion of a ship or other vehicle, a power unit for driving the shaft in a reverse direction, with a unidirectional driving device of the kind referred to in the transmission line between the driven shaft and that one of the two forward drive power units which is to drive the shaft at the lower forward speed, disengaging mechanism for positively disengaging the clutch elements of the unidirectional driving device, and a catch device associated with the disengaging mechanism in accordance with the present invention, so that the clutch elements of the unidirectional driving device can be disengaged and positively maintained disengaged when the reversing power unit is to be brought into operation, and cannot be inadvertently permitted to engage in circumstances in which a violent engagement would occur.

In such a case and in general it will be seen that, whenever the disengaging mechanism is in its disengaged position to hold the clutch elements of the unidirectional driving device out of engagement and the direction of relative rotation of these elements is such that if they were released they would instantly engage, the catch device is operative and makes it impossible for an operator so to release the disengaging mechanism. The sudden engagement of the clutch elements of the unidirectional driving device under conditions in which the speeds of rotation of the driving and driven elements are appreciably different, with the consequent risk of damaging or wrecking the unidirectional driving device itself and/or mechanism and apparatus associated with it, is thus prevented. In fact the only condition under which the unidirectional driving device can move from its disengaged to its engaged position is when the driving and driven clutch elements just begin to rotate in the appropriate direction relatively to one another, either after both being stationary or as the speed rotation of one relatively to the other in one direction falls to zero and reversed relative rotation is just beginning.

Figure 2:
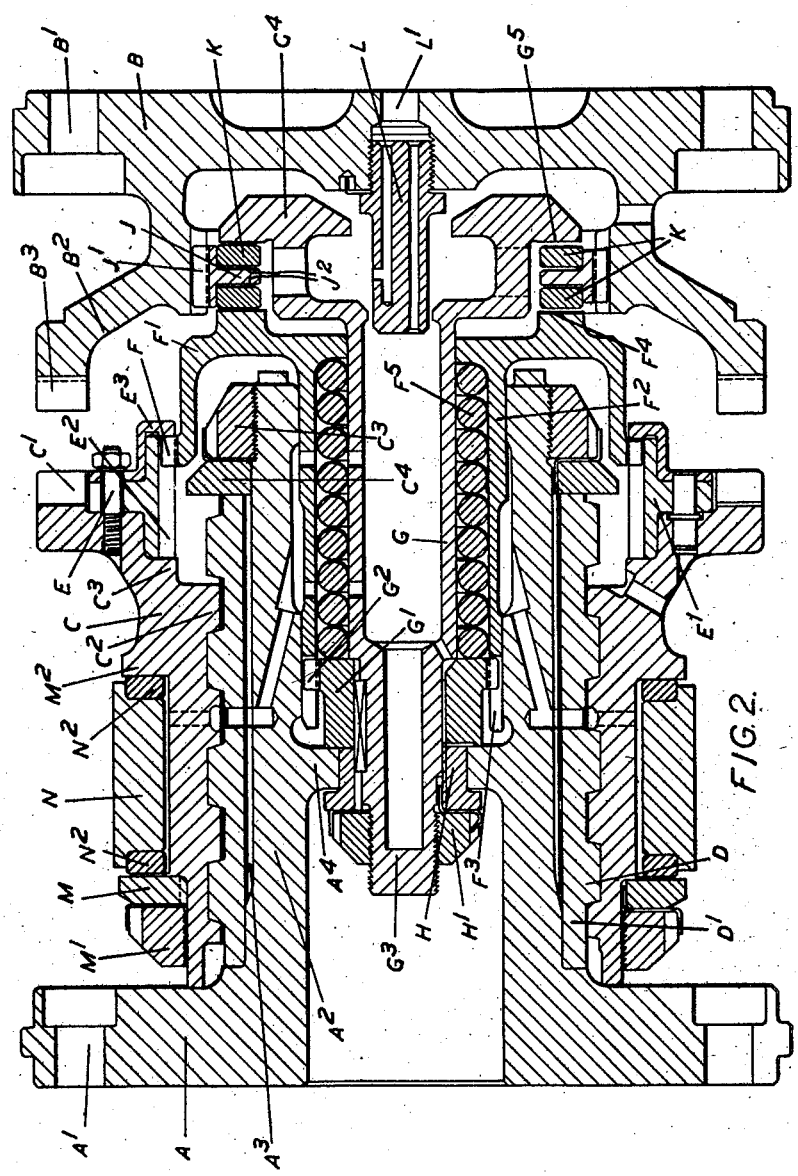
Figure 3:
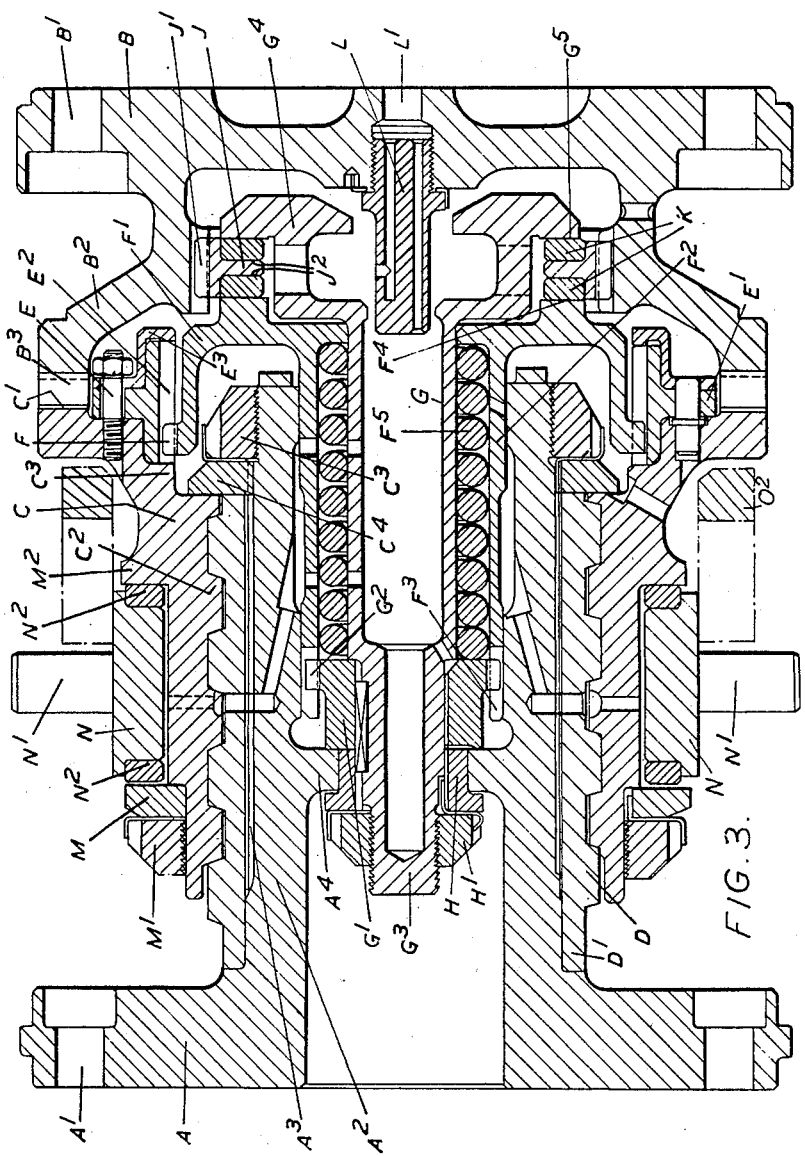
Figure 4:
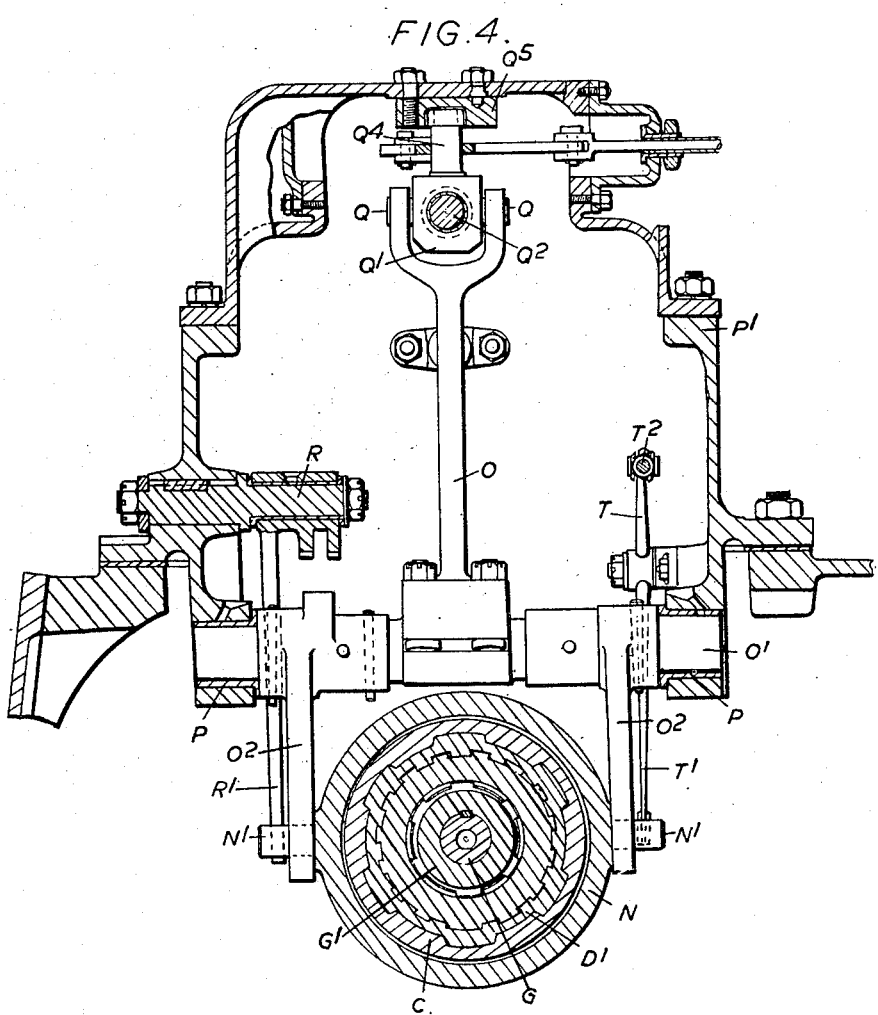
Figure 5:
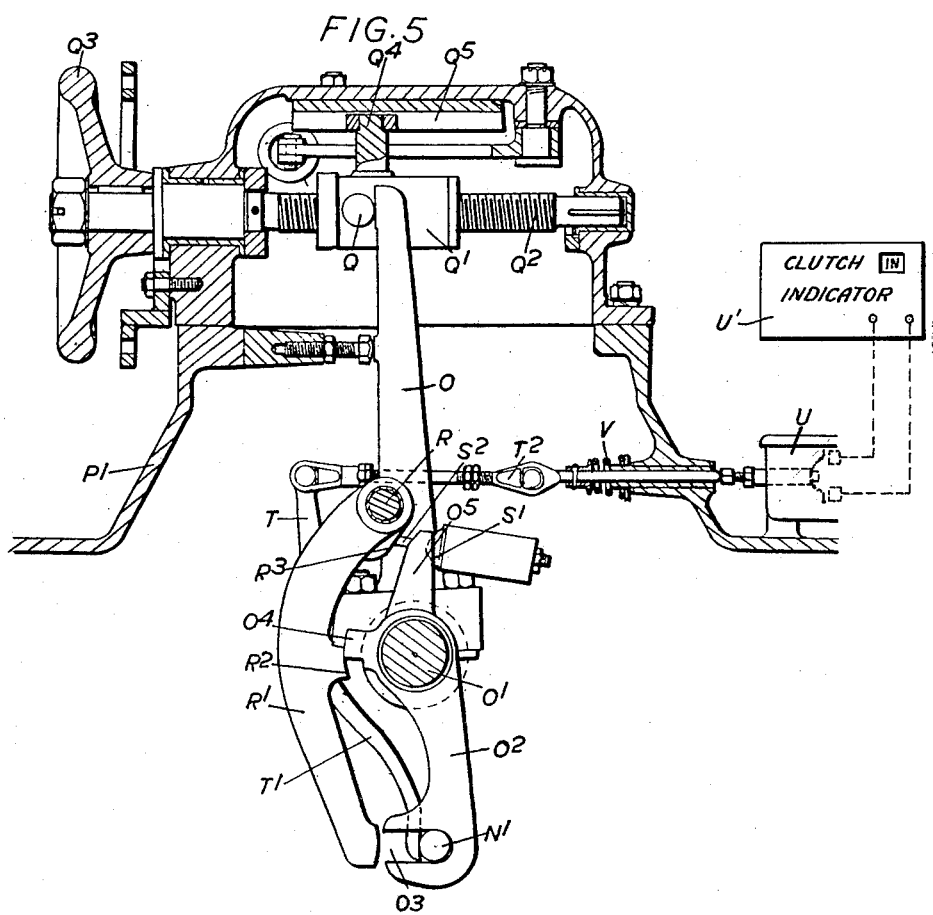

The invention may be carried into practice in various ways but one construction according to the invention as applied to transmission mechanism employed in ship propulsion apparatus embodying turbines as prime movers, is illustrated by way of example in the accompanying drawings, in which:

Figure 1 is a diagrammatic view of the general form of propulsion apparatus embodying transmission apparatus to which the invention is applied, Figure 2 is a sectional side elevation in a plane containing its axis of rotation of the unidirectional transmission device employed in the transmission apparatus with the parts in their disengaged position, Figure 3 is a similar view to Figure 2 of the unidirectional transmission device with the parts in their engaged position, Figure 4 is a cross-section at right angles to the axis of rotation of the unidirectional transmission device showing the disengaging mechanism associated therewith, Figure 5 is a side elevation partly in section of the disengaging mechanism shown in Figure 4, and Figures 6, 7 and 8 are side elevations showing respectively three different operative positions of the disengaging mechanism.

The propulsion apparatus diagrammatically shown in Figure 1, to which the form of the invention now to be described is applied, comprises a driven shaft 1 driving, for example, the propeller 2 of a ship, the driven shaft being coupled by gearing indicated at 3 to the shaft 4 of a turbine 5, hereinafter called the high speed turbine, for driving the propeller in the forward direction at a relatively high speed and to the shaft of a reversing turbine 6, which may be built, as indicated, as a unit with the high speed turbine 5 and is constructed to rotate the shaft 4 in a direction to cause reverse rotation of propeller 2. The shaft 1 is also connected by gearing indicated at 7 to a shaft 8 connected through a unit 9 including a unidirectional driving device having associated with it control mechanism according to the invention, to the shaft 10 of a turbine 11 hereinafter called the low speed turbine for driving the shaft and propeller 2 through the unit 9, in the forward direction at relatively low speed.

The unidirectional driving device incorporated in the unit 9 is constructed as described in the specification of United States patent application No. 240,722, filed August 7, 1951, by the present applicant jointly with Benjamin W. Barlow, for Unidirectional Transmission Devices, as shown in Figures 2, 3 and 4, and comprises coaxial driving and driven members A and B arranged to be connected respectively to the driving and driven shafts 10 and 8 as by means of bolts passing through holes $A^1$, $B^1$ therein. The driven member B has formed integral with it a part $B^2$ carrying one half $B^3$ of a dog clutch, hereinafter called the driven dog clutch element. The other or driving half of the dog clutch is formed on the adjacent end face of a sleeve member C as shown at $C^1$. The sleeve member C has a quick-pitch screwthread, indicated at $C^2$, formed in its bore and engaging a corresponding quick-pitch screwthread D upon a sleeve $D^1$ which is rigidly secured by means of a ring nut $C^3$ and a washer member $C^4$ to a boss portion $A^2$ of the member A. The sleeve $D^1$ is held from rotation relatively to the boss $A^2$ by splines indicated at $A^3$ and, functionally, forms a part of the driving member A, the composite construction being adopted only for convenience of manufacture.

The sleeve C has secured to its righthand end by bolts E a ring-like part $E^1$ of T-shaped cross section, the interior of which is formed with internal splines $E^2$, the ends of the grooves between the splines being closed respectively by a part $C^3$ of the sleeve C and by a separate annular collar $E^3$. The internal splines $E^2$ are engaged by external splines F on a member $F^1$, hereinafter called the driving friction clutch member. The member $F^1$ has a boss portion $F^2$ which extends into and is slidably and rotatably mounted within a bore in the part $A^2$ of the driving member A, the inner end of the boss portion $F^2$ being formed with longitudinal splines or slots $F^3$. Mounted so as to be free to slide axially within the bore of the boss portion $F^2$ is a hollow shaft-like member G on the inner end of which is rigidly mounted an annular connecting piece $G^1$ having external splines $G^2$ which engage the splines or slots $F^3$ so that relative axial movement but not relative rotation can take place between the members $F^1$ and G. The inner end of the member G is also connected to the part $A^2$ of the driving member by means of a bushing H lying within a bore in an internal flange $A^4$ on the part $A^2$ and a nut $H^1$ engaging a screwthreaded section $G^3$ at the extreme inner end of the member G to permit relative rotation of said member G with respect to the driving member A but restricting relative axial movement thereof.

The outer end of the member G is provided with a flange-like portion $G^4$ having an annular friction surface $G^5$ which lies opposite to but is spaced from an annular friction surface $F^4$ on the member $F^1$.

Interposed between the two friction surfaces $G^5$ and $F^4$ which constitute driving friction surfaces is an annular element J constituting a driven frictional element provided with external splines as indicated at $J^1$ by which it is connected to the driven member B so as to be held from rotation but free to slide axially relatively to that member. Interposed between each of two friction faces $J^2$ on the member J and the adjacent friction face $F^4$ or $G^5$ is an annular disc K of friction material so that the parts $F^4$, $G^5$, J and K together form a frictional clutch device.

A lubricant distributing nozzle device indicated at L is provided by which lubricant can be fed from a bore $L^1$ in the driven member B to the friction surfaces referred to and to the interior of the member G from which it flows through suitable passages to the various relatively movable engaging surfaces of the parts of the complete transmission device, including those of the quick-pitch screwthread.

The sleeve C has secured to one end thereof a ring-like part M by means of a nut $M^1$, which ring-like part in association with a shoulder $M^2$ on the sleeve C forms a circumferential groove in which lies a thrust collar N.

In operation assuming the collar N is free to move axially, as long as the driving member A is rotating relatively to the driven member B in a sense such that the frictional drag imposed by the engagement of the frictional surfaces of the friction clutch device $F^4$, $G^5$, J, and K acting through the member $F^1$ and the splines F and $E^2$ on the sleeve C tends to rotate this sleeve on the member A in a direction causing it to move to the left, the parts will occupy the positions shown in Figure 2 with the flange member $E^3$ acting on the ends of the splines F in a direction tending to move the member $F^1$ to the left and thereby cause disengagement of the surfaces of the friction clutch device. Since the disengaging force thus acting on the ends of the splines F is dependent upon the frictional drag imposed by the engaging friction surfaces of the friction clutch device under the influence of the spring $F^5$, it will be seen that the result of the action of the flange member $E^3$ on the ends of the splines F under this condition will be to ensure that the frictional drag between the friction surfaces remains at a substantially constant predetermined figure since any tendency for the drag to increase will correspondingly increase the disengaging force and vice versa.

If and when the rotation of the driving member A relatively to the driven member B starts in the opposite direction, frictional drag will occur in the opposite direction causing the sleeve C to rotate so as to move to the right. Thus the flange member $E^3$ will move out of engagement with the splines F and the frictional drag will at once become directly dependent solely upon the force applied by the spring $F^5$ and the sleeve C will then rotate on the part $A^2$ and thus move to the right until the dogs $C^1$ come into engagement with the dogs $B^3$, after which these dogs will be forced into and held in full engagement by the torque transmitted through them and the parts will achieve and occupy the positions shown in Figure 3 as long as the direction of torque remains unchanged.

Immediately there is any reversal of the direction of torque it will be seen that the sleeve C will be rotated again upon the part $A^2$ first by reaction between the dogs until they disengage, and thereafter by reason of the frictional drag in the friction clutch device until the parts again occupy the disengaged position.

The collar N has trunnions $N^1$ formed on or rigidly secured to it and arranged to be acted upon by mechanism by which it can be positively moved so as to move the sleeve into the position in which the clutch element C is in its disengaged position and to retain it in that position. This mechanism comprises a control lever O rigidly secured to a transverse control shaft $O^1$ supported in bearings P in the casing $P^1$ which encloses the unidirectional driving device and the greater part of the control mechanism, the control shaft $O^1$ lying above the unidirectional driving device as shown, and carrying two downwardly projecting arms $O^2$ constituting in effect a forked lever the lower ends of which are formed with slots $O^3$ to receive the trunnions $N^1$. The upper end of the control lever O is arranged to be acted upon by trunnions Q on a nut member $Q^1$ through the screwthreaded bore of which passes a screwthreaded control shaft $Q^2$ which is mounted in bearings in the casing $P^1$ and has one end projecting through the casing as shown and provided with a hand wheel $Q^3$ by which the shaft can be rotated, the nut member $Q^1$ being held from rotation by a projection $Q^4$ thereon engaging a slot in a guide member $Q^5$ secured to the casing $P^1$. It will thus be seen that by rotating the shaft $Q^2$ the nut member $Q^1$ can be caused to travel along it and thus act through the control lever O, the control shaft $O^1$, the arms $O^2$, the trunnions $N^1$ and the collar N to move the sleeve C positively into and maintain it in its disengaged position or alternatively, if the sleeve be in such position, to move the arms $O^2$ into a position in which they prevent the sleeve C moving into its engaged position.

Formed on one of the arms $O^2$ is a lug $O^4$ hereinafter called the locking lug, while pivotally mounted on a horizontal pivot pin R above this arm is a catch lever $R^1$ having formed thereon, at an intermediate point in its length, a catch lug $R^2$ which can cooperate with the locking lug $O^4$ in a manner hereinafter described. The lower end of the catch lever $R^1$ lies in the path of the adjacent trunnion $N^1$ and on the side thereof remote from that which engages the base of the slot in the adjacent arm.

A compression spring S acts at one end through a thrust member $S^1$ on a lug $O^5$ on the adjacent arm $O^2$ so as to tend to rock the shaft $O^1$ always into the position in which it permits the sleeve C to move into its engaged position, and at its other end through a tension rod $S^2$ on a lug $R^3$ on the catch lever so as to tend to rock this lever always into the position in which the catch lug $R^2$ thereon lies in the path of the locking lug $O^4$.

Mounted on a pivot pin above the arm $O^2$ remote from the locking lever $R^1$ is a lever T the lower arm $T^1$ of which engages the adjacent trunnion $N^1$ on the side thereof remote from that which engages the base of the slot $O^3$ in the adjacent arm $O^2$, while its upper arm is connected to the end of a rod assembly $T^2$ which is mounted to slide in a bearing in the casing $P^1$ and operates an electric switch U or other device controlling an indicator. A spring V associated with the switch U or the like serves to maintain the lower end of the arm $T^1$ always in engagement with the trunnion $N^1$ and the arrangement is such that, by indicating the position of an electromagnetic collar N, the indicator $U^1$ controlled by the switch U indicates to an operator whether at any moment the sleeve C is in its engaged or disengaged position.

In operation, assuming that the direction of relative rotation of the driving and driven members A and B to be such that the sleeve C is automatically maintained in its disengaged position, as shown in Figure 2, the appropriate one of the trunnions N¹ will act on the lower end of the catch lever R¹ to maintain it in the position shown in Figure 6 in which it will be seen that the catch lug R² is out of the path of the locking lug O⁴, and the control lever O can thus be rocked by rotation of the hand wheel Q³ into the position in which it will permit movement of the sleeve C into the position shown in Figure 3, that is to cause engagement of the clutch members C¹ and B³ as and when the direction of relative rotation changes, after which the parts will occupy the relative positions shown in Figure 8. Moreover, if it is then desired to cause movement of the sleeve C into its disengaged position by operation of the hand wheel Q³ it will be seen that this can be effected and that, once disengagement has been effected, re-engagement cannot again take place unless or until first the direction of relative rotation has again become that tending to cause disengagement, second the hand wheel has been operated while this condition persists to move the control lever O into the position permitting engagement, and then the direction of relative rotation again becomes that tending to cause engagement.

If, and when, with the sleeve C maintained in its disengaged position by the lever O occupying the position shown in Figure 6 and with the direction of relative rotation of the driving and driven members A and B such that the sleeve C if free to do so would move into its engaged position, the lever O is then permitted to move to the left in Figure 5 by rotation of the hand wheel Q³, the collar N and trunnions N¹ will move to the right thus permitting the catch lever R¹ similarly to move to the right until the parts occupy the positions shown in Figure 7, in which it will be seen that the catch lug R² has been engaged by the locking lug O⁴ and further movement of the arms O² to the right and hence movement of the sleeve C into its engaged position is positively prevented.

Thus in no circumstances, when the clutch is being positively maintained in its disengaged position by the control lever O and the direction of relative rotation of the members A and B is such that the clutch would engage if it were free to do so, can the control lever O be moved to permit such engagement, whereas the control lever O can be moved into the position in which it permits engagement of the clutch whenever the condition of the transmission is such that the clutch is at the moment being automatically maintained disengaged. In this way, while the clutch can be positively maintained out of engagement when desired, its conditions of engagement are automatically limited to those in which it automatically comes into engagement just at the moment when the driving member A begins to rotate in the appropriate direction relatively to the driven member B so that the unidirectional driving device can only be called upon to take up the drive under the correct conditions.

It will, moreover be seen that, while the low speed turbine 11 will be able to take over the drive from the high speed turbine 5 through the unidirectional driving device 9 automatically at precisely the correct moment and vice versa as the two turbines respectively take over the forward drive from one another, and the unidirectional driving device can be positively maintained disengaged to permit the reverse drive by the reversing turbine 6 without driving the rotor of the low speed turbine 11, mal-operation of the control mechanism which might result in violent engagement of the unidirectional driving device, and damage or wreckage of the device and/or the apparatus associated with it, is rendered impossible.

What I claim as my invention and desire to secure by Letters Patent is:

1. Transmission apparatus including in combination driving and driven members, driving and driven positive clutch elements on said members, one of said elements being movable axially relatively to the other to cause engagement and disengagement of said elements and being mounted upon its associated member for limited rotation relatively thereto, means for causing said axially movable element to move axially on its said associated member as it rotates relatively thereto, a frictional transmission device arranged for transmission of torque between said axially movable element and the other of said elements whereby axial movement of said element to cause engagement and disengagement of the clutch elements tends to take place automatically according to the direction of relative rotation between said elements, disengaging mechanism which in its operative position holds the said axially movable element in its disengaged position, a catch device which in its operative position prevents said disengaging mechanism moving from its disengaged to its engaged position, and means controlling the catch device in accordance with the movement of the movable clutch element to cause the catch device to occupy its operative position at all times when the relative rotation between the said clutch elements is in the direction in which the torque transmitted by the frictional transmission device tends to cause engagement of the clutch elements.

2. Transmission apparatus as claimed in claim 1 in which the movable element of the clutch has a degree of movement in the same direction as that which causes disengagement of the clutch beyond the disengaged position in which it is held by the disengaging mechanism, and the catch device is caused by this additional movement to move into its inoperative position, whereas when the movable clutch element is bearing on the disengaging mechanism in an attempt to cause engagement of the clutch the catch device occupies its operative position.

3. Transmission apparatus as claimed in claim 2 in which the movement of the movable clutch element to cause engagement and disengagement of the clutch is axial, the disengaging mechanism includes a lever which acts on a thrust member arranged to move axially with the movable clutch element, and the catch device comprises a catch lever acted upon by the axially movable clutch element and having a catch part which when the movable element of the clutch occupies the disengaged position in which it is maintained by the disengaging lever when such element is attempting to move into its engaged position, co-operates with a locking member to prevent the disengaging lever being moved into its engaged position whereas when the movable clutch element occupies the position in which it is maintained automatically by reason of the direction of relative rotation of its driving and driven elements, the catch part lies in an inoperative position.

4. Transmission apparatus as claimed in claim 3 in which the catch lever is acted upon by the thrust member on which the disengaging lever acts.

5. Transmission apparatus as claimed in claim 1 including indicating mechanism responsive to movement of the movable clutch element to indicate whether such element is in its engaged or disengaged position.

6. A power plant comprising a driven shaft, a first prime mover connected to the driven shaft by transmission mechanism and capable of driving said shaft in one direction at a relatively high speed, a second prime mover connected to said shaft through transmission mechanism and capable of driving said shaft in said direction at relatively low speed, and a third prime mover connected to said shaft through transmission mechanism and capable of driving said shaft in the reverse direction, the transmission mechanism between said second prime mover and said shaft including in combination driving and driven members, driving and driven positive clutch elements on said members, one of said elements being movable axially relatively to the other to cause engagement and disengagement of said elements and being mounted upon its associated member for limited rotation relatively thereto, means for causing said axially movable element to move axially on its said associated member as it rotates relatively thereto, a frictional transmission device arranged for transmission of torque between said axially movable element and the other of said elements whereby axial movement of said element to cause engagement and disengagement of the clutch elements tends to take place automatically according to the direction of relative rotation between said elements, disengaging mechanism which in its operative position holds the said axially movable element in its disengaged position, a catch device which in its operative position prevents said disengaging mechanism moving from its disengaged to its engaged position, and means controlling the catch device in accordance with the movement of the movable clutch element to cause the catch device to occupy its operative position at all times when the relative rotation between the said clutch elements is in the direction in which the torque transmitted by the frictional transmission device tends to cause engagement of the clutch elements.

References Cited in the file of this patent

UNITED STATES PATENTS

| Number | Name | Date |
|---|---|---|
| 2,101,825 | Thompson | Dec. 7, 1937 |
| 2,384,439 | Carnagua et al. | Sept. 11, 1945 |
| 2,399,098 | Carnagua et al. | Apr. 23, 1946 |
| 2,433,428 | Carnagua et al. | Dec. 30, 1947 |
| 2,561,765 | Wood | July 24, 1951 |